US008793388B2

(12) United States Patent
Siegel et al.

(10) Patent No.: US 8,793,388 B2
(45) Date of Patent: *Jul. 29, 2014

(54) METHOD AND APPARATUS FOR PROCESSING A CALL TO AN AGGREGATE ENDPOINT DEVICE

(75) Inventors: Steven A. Siegel, Mendham, NJ (US); Nancy E. Lambros, Spicewood, TX (US); Leopold Strahs, Williamsburg, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 69 days.

This patent is subject to a terminal disclaimer.

(21) Appl. No.: 12/648,198

(22) Filed: Dec. 28, 2009

(65) Prior Publication Data

US 2011/0161505 A1 Jun. 30, 2011

(51) Int. Cl.
| | | |
|---|---|---|
| G06F 15/16 | (2006.01) | |
| H04L 29/06 | (2006.01) | |
| H04L 29/08 | (2006.01) | |
| H04L 29/12 | (2006.01) | |
| H04M 3/42 | (2006.01) | |
| H04M 7/00 | (2006.01) | |
| H04M 7/12 | (2006.01) | |

(52) U.S. Cl.
CPC .............. *H04L 65/10* (2013.01); *H04L 65/1016* (2013.01); *H04L 65/1069* (2013.01); *H04L 67/14* (2013.01); *H04L 67/148* (2013.01); *H04L 61/3085* (2013.01); *H04L 61/3095* (2013.01); *H04M 3/42017* (2013.01); *H04M 3/42025* (2013.01); *H04M 3/42119* (2013.01); *H04M 3/42136* (2013.01); *H04M 3/4217* (2013.01); *H04M 7/006* (2013.01); *H04M 7/0087* (2013.01); *H04M 7/12* (2013.01)

USPC ........... 709/228; 709/203; 709/204; 709/205; 709/206; 709/217; 709/218; 709/223; 709/224; 709/225; 709/227; 709/229; 709/230; 709/231; 709/238; 455/435.1; 455/435.2; 455/414.1; 455/414.3; 455/415; 455/416; 455/417; 455/433; 455/445; 455/432.1; 455/552.1; 455/404.1; 455/404.2; 455/411; 455/434; 455/466; 370/352; 370/328; 370/389; 370/356; 370/331; 370/395.52; 370/401; 379/201.12; 379/201.01

(58) Field of Classification Search
USPC ......... 709/217, 223, 227, 228, 230, 203, 204, 709/205, 206, 218, 224, 225, 229, 231, 709/238; 455/435.1, 435.2, 414.1, 414.3, 455/415, 416, 417, 433, 445, 432.1, 552.1, 455/404.1, 404.2, 411, 434, 466; 370/352, 370/401, 328, 410, 389, 356, 331, 395.52; 379/201.12, 201.01
See application file for complete search history.

(56) References Cited

U.S. PATENT DOCUMENTS

| | | | | |
|---|---|---|---|---|
| 6,563,824 | B1 * | 5/2003 | Bhatia et al. | 370/392 |
| 6,829,239 | B1 * | 12/2004 | Bhatia et al. | 370/392 |
| 7,542,481 | B2 * | 6/2009 | Faccin et al. | 370/469 |

(Continued)

*Primary Examiner* — Saket K Daftuar

(57) ABSTRACT

A method and an apparatus for processing a call to an aggregate endpoint device over a network are disclosed. For example, the method receives a session request by a Serving-Call Session Control Function (S-CSCF), wherein a route header for the session request comprises an aggregate endpoint identifier, and interacts with an application server to receive a Public User Identity (PUID) of the aggregate endpoint device in accordance with the aggregate endpoint identifier. The method performs a termination processing for the session request using the PUID of the aggregate endpoint device, and forwards the session request towards the aggregate endpoint device.

18 Claims, 4 Drawing Sheets

(56) References Cited

U.S. PATENT DOCUMENTS

| | | |
|---|---|---|
| 7,561,535 B2 * | 7/2009 | Naqvi et al. .................. 370/260 |
| 7,584,318 B2 * | 9/2009 | Haechten et al. ............. 710/316 |
| 7,724,753 B2 * | 5/2010 | Naqvi et al. .................. 370/410 |
| 7,787,878 B2 * | 8/2010 | Li et al. ....................... 455/432.1 |
| 7,852,838 B2 * | 12/2010 | Miller et al. .................. 370/389 |
| 7,856,226 B2 * | 12/2010 | Wong et al. ................. 455/414.1 |
| 7,864,936 B2 * | 1/2011 | Naqvi et al. ............. 379/201.12 |
| 8,489,743 B2 * | 7/2013 | Astrom et al. ................ 709/226 |
| 2004/0165594 A1 * | 8/2004 | Faccin et al. ................ 370/395.2 |
| 2006/0018272 A1 * | 1/2006 | Mutikainen et al. .......... 370/328 |
| 2006/0072570 A1 | 4/2006 | Tadamura et al. |
| 2006/0291412 A1 * | 12/2006 | Naqvi et al. .................. 370/328 |
| 2006/0291487 A1 * | 12/2006 | Naqvi et al. .................. 370/401 |
| 2006/0291488 A1 * | 12/2006 | Naqvi et al. .................. 370/401 |
| 2006/0291489 A1 * | 12/2006 | Naqvi et al. .................. 370/401 |
| 2006/0294244 A1 * | 12/2006 | Naqvi et al. .................. 709/227 |
| 2007/0121890 A1 * | 5/2007 | Li et al. ....................... 379/221.13 |
| 2007/0133517 A1 * | 6/2007 | Miller et al. .................. 370/352 |
| 2008/0186921 A1 * | 8/2008 | Long et al. .................... 370/331 |
| 2008/0227450 A1 * | 9/2008 | Matsumoto et al. ........ 455/435.1 |
| 2008/0227451 A1 * | 9/2008 | Fukui et al. ................. 455/435.1 |
| 2008/0247384 A1 | 10/2008 | Arauz-Rosado et al. |
| 2008/0301787 A1 * | 12/2008 | Lindholm et al. ................ 726/5 |
| 2009/0068996 A1 * | 3/2009 | Bakker et al. .............. 455/414.1 |
| 2009/0103518 A1 * | 4/2009 | Yu et al. ........................ 370/352 |
| 2009/0125626 A1 * | 5/2009 | Yeoum et al. ................. 709/227 |
| 2009/0154452 A1 | 6/2009 | Ku et al. |
| 2009/0164642 A1 * | 6/2009 | Foti .............................. 709/227 |
| 2009/0210743 A1 * | 8/2009 | Gu et al. ......................... 714/15 |
| 2009/0213838 A1 * | 8/2009 | Van Elburg et al. .......... 370/352 |
| 2009/0245240 A1 * | 10/2009 | Mao et al. ..................... 370/352 |
| 2009/0257418 A1 * | 10/2009 | Allen et al. .................... 370/338 |
| 2009/0262920 A1 * | 10/2009 | Henrikson et al. ........ 379/221.09 |
| 2009/0279425 A1 * | 11/2009 | Du et al. ........................ 370/216 |
| 2009/0298458 A1 * | 12/2009 | Bakker et al. .............. 455/404.1 |
| 2010/0062767 A1 * | 3/2010 | Leis et al. ................... 455/435.1 |
| 2010/0075642 A1 * | 3/2010 | Ejzak et al. ................. 455/414.1 |
| 2010/0165833 A1 * | 7/2010 | Du et al. ........................ 370/217 |
| 2010/0278125 A1 * | 11/2010 | Clair et al. .................... 370/329 |
| 2011/0310888 A1 * | 12/2011 | Merino Vazquez et al. .. 370/352 |
| 2012/0219127 A1 | 8/2012 | Lu et al. |

\* cited by examiner

METHOD AND APPARATUS FOR PROCESSING A CALL TO AN AGGREGATE ENDPOINT DEVICE

The present disclosure relates generally to communication networks and, more particularly, to a method and apparatus for processing a call to an aggregate endpoint device over a network, e.g., an Internet Protocol (IP) network, a Voice over Internet Protocol (VoIP) network, and the like.

BACKGROUND

An enterprise customer may enable users (e.g., employees of the enterprise customer) to access communication services using a Private Branch Exchange (PBX). For example, the PBX can be used to enable the enterprise customer to subscribe to a limited number of connections to a circuit switched network, e.g., the Public Switched Telephone Network (PSTN). The limited number of connections can then be shared among a large number of employees. The PBX may then serve as an aggregate endpoint device. For example, the sharing of the limited number of external lines may be facilitated using an aggregate endpoint device such as a PBX.

Prior to transitioning services from a traditional circuit switched network to an Internet Protocol (IP) Multimedia Subsystem (IMS) network, many enterprise customers require similar capability from the IMS network. However, unlike traditional circuit switched networks, IMS networks are initially designed for single user endpoint devices. When a session directed towards a destination address (e.g., a user that is behind a PBX) served by an aggregate endpoint device is received, the IMS network elements need to determine to which aggregate endpoint device the session is to be directed. For example, the Serving-Call Session Control Function (S-CSCF), Home Subscriber Server (HSS), Application Servers (ASs), etc. need to process the session request to determine the appropriate PBX. The processing and data storage requirements may then be costly for the network service provider.

SUMMARY

In one embodiment, the present disclosure describes a method and an apparatus for processing a call to an aggregate endpoint device over a network. For example, the method receives a session request by a Serving-Call Session Control Function (S-CSCF), wherein a route header for the session request comprises an aggregate endpoint identifier, and interacts with an application server to receive a Public User Identity (PUID) of the aggregate endpoint device in accordance with the aggregate endpoint identifier. The method performs a termination processing for the session request using the PUID of the aggregate endpoint device, and forwards the session request towards the aggregate endpoint device.

In an alternate embodiment, the method receives a location-info-request (LIR) query by a Home Subscriber Server (HSS) from an Interrogating-Call Session Control Function (I-CSCF). The method performs a lookup in accordance with a request Uniform Resource Identifier (URI), and returns a location-info-answer (LIA) together with an aggregate endpoint identifier.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for processing a call to an aggregate endpoint device over a network. Although the present disclosure is discussed below in the context of IP networks, e.g., an Internet Protocol (IP) Multimedia Subsystem (IMS) network, the present disclosure is not so limited. Namely, the present disclosure can be applied to packet networks in general, e.g., Voice over Internet Protocol (VoIP) networks, Service over Internet Protocol (SoIP) networks, and the like.

Figure 1:
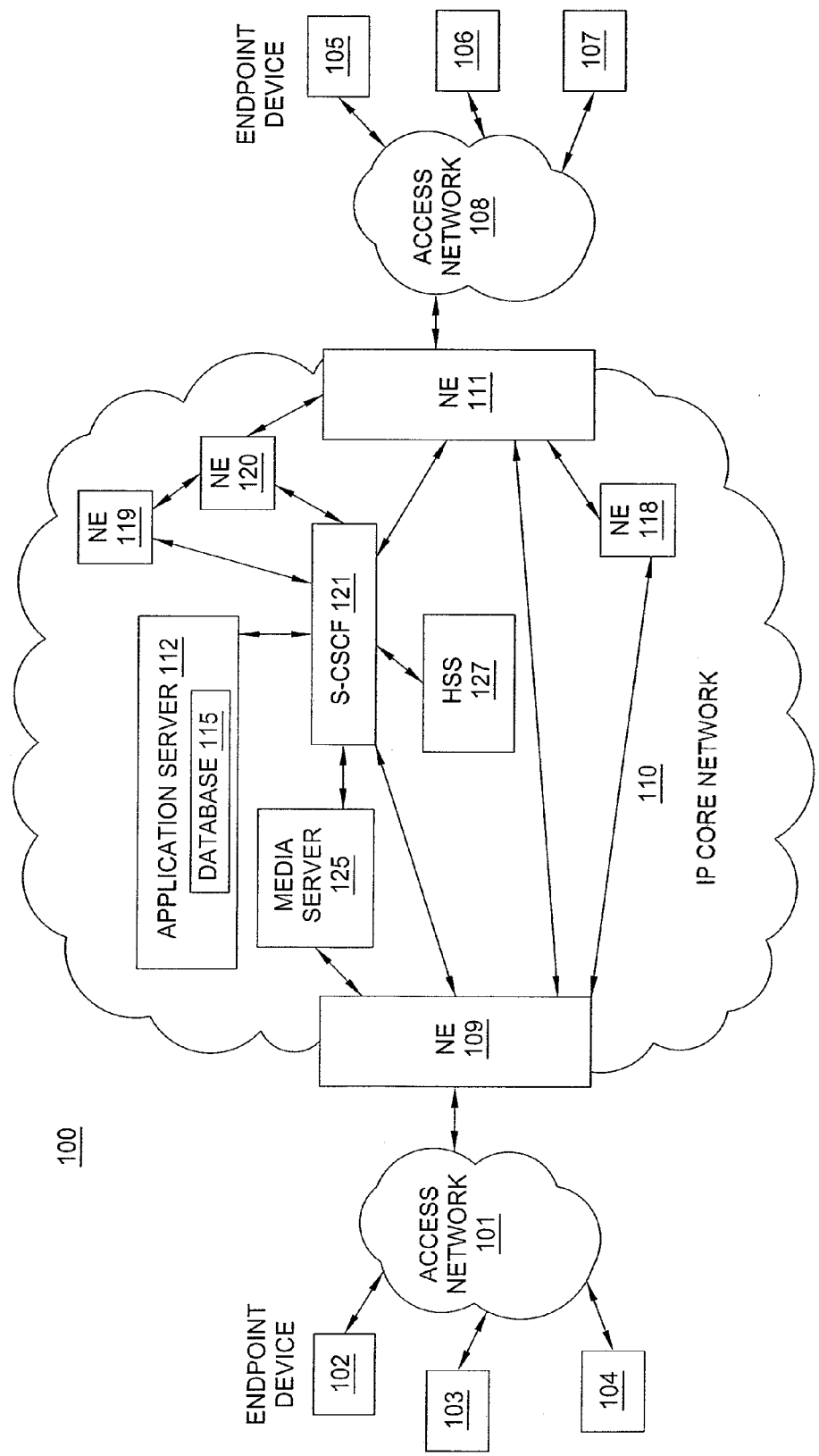
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet Protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, smart phones, PBXs, aggregate endpoints (e.g., an aggregate endpoint that employs a SIP user agent to interact with the network on behalf of a plurality of endpoints aggregated behind it) and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network, a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a Home Subscriber Server (HSS) 127, a Serving—Call Session Control Function (S-CSCF) 121, a Media Server (MS) 125, and an Application Server 112 that contains a database 115. For a specific session, the S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IP based core backbone network 110. The S-CSCF 121 may be implemented to register users and to provide various services (e.g., VoIP services). The S-CSCF interacts with the appropriate VoIP/SoIP service related applications servers (e.g., 112), when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an SIP URI, and so on. For example, the S-CSCF routes to a P-CSCF via the address established at UA registration, e.g., as indicated by the SIP URI. The P-CSCF then routes to the SIP User Agent (UA) over a relationship that is established between the P-CSCF and the SIP UA which may represent an aggregate endpoint. This relationship could be a SIP trunk.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present disclosure.

The above IP network is only described to provide an illustrative environment in which packets for voice, data, and multimedia services are transmitted on IP Multimedia Subsystem (IMS) networks. In one embodiment, the IMS service provider may wish to enable customers to transition their services from a traditional circuit switched network accessed through an enterprise Private Branch Exchange (PBX) to the IMS network. However, most enterprise customers are accustomed to using an aggregate endpoint such as a PBX to utilize a small number of connections to the service provider's network to support a large number of users. For example, an enterprise customer may subscribe only to five external phone lines to support a larger number of employees, e.g., 10, 20, or 30 employees, who are sharing the five external phone lines.

However, unlike traditional circuit switched networks, IMS networks are designed for single user endpoint devices that access the IMS network through a single Proxy-Call Session Control Function (P-CSCF). Prior to transitioning services from a traditional circuit switched network to the IMS network, an enterprise customer may require a similar or better capability from the IMS network.

In one embodiment, the current method processes a session directed to an aggregate endpoint device, e.g., a PBX. In order to more clearly describe the current disclosure, the following networking terminologies are first provided.

E.164; and

ENUM (tElephone NUmbering Mapping).

E.164 refers to an ITU (International Telecommunications Union)-T recommendation which defines the international public telecommunication numbering plan for formatting telephone numbers such that they may be signaled across one or more networks. The E.164 format includes a country code and subsequent digits, but not the international prefix.

ENUM refers to a standard protocol defined by the Internet Engineering Task Force (IETF) for translating phone numbers that are in E.164 format to Internet domain names such that a Domain Name Server (DNS) may resolve the IP addresses for E.164 numbers the same way it resolves traditional website domains. For example, ENUM may be used to transform a phone, a fax or a pager number into a URI (Uniform Resource Identifier).

In order to translate a phone number to an Internet Domain name, the phone number is first provided in an E.164 format. Specifically, the phone number is first translated or converted to a full E.164 formatted number. For example, the original phone number may not have indicated a country code, area code, etc. However, an E.164 formatted phone number includes a country code, area code and the specific number within the area code. For example, "1" is the country code for all phone numbers in the United States of America (USA). If the original USA phone number is 987-555-1234, it is translated to an E.164 formatted number yielding 1-987-555-1234. The E.164 number is then reduced to digits only, e.g., 19875551234. The digits are then reordered back to front, e.g. 43215557891. Once the digits are reordered, dots are placed between each digit and the Internet domain e164.arpa is added to the end. For the above example, the resulting Internet domain is 4.3.2.1.5.5.5.7.8.9.1.e164.arpa.

In operation, an ENUM server may then be queried by the S-CSCF of the calling party to resolve on the domain name 4.3.2.1.5.5.5.7.8.9.1.e164.arpa. For example, an IP Multimedia Subsystem (IMS) network may use an ENUM server to resolve phone number that is in E.164 format, i.e., the contact information of the phone number. The S-CSCF of the calling party may then query a DNS for the regular routing of the contact information resided in the NAPTR (Naming Authority Pointer) resource records, e.g., the SIP URI. In sum, the S-CSCF of the calling party will send the ENUM query and the ENUM server will return the NAPTR resource records if the E.164 number is registered, wherein the S-CSCF then queries the DNS for the destination of the returned records, e.g., the SIP URI of the called party.

It should be noted that the customer may have a set of NAPTR resource records. For example, the customer may have a SIP address, a telephone number, a presence service number, an email address, etc. The query may then retrieve the set of NAPTR resource records for the customer.

If the S-CSCF of the calling party receives a successful response to the query (queries) sent to the ENUM and DNS, the S-CSCF then routes the call signaling to the Interrogating-Call Session Control Function (I-CSCF) of the returned domain for termination. That is, the S-CSCF routes the call signaling to the I-CSCF handling the destination of the returned record. The I-CSCF may then interrogate the HSS to determine the S-CSCF of the called party. If the HSS then returns a Serving-Call Session Control Function Fully Qualified Domain Name (S-CSCF FDQN) (broadly referred to as domain information) of the called party, the I-CSCF routes the incoming session request (SIP INVITE message) to the S-CSCF of the called party for completion.

In one embodiment, the current method processes a session request for an aggregate endpoint device via a S-CSCF of a called party, wherein the S-CSCF of the called party communicates with the aggregate endpoint device via a P-CSCF. The aggregate endpoint device can be used for an originating session or terminating session. For example, the session may be initiated by a user endpoint device that utilizes the aggregate endpoint device or may be terminating at the user endpoint device that utilizes the aggregate endpoint device.

If the session is an originating session, the aggregate endpoint device can forward the session to an S-CSCF via a P-CSCF. The P-CSCF receives from the aggregate endpoint device information about the served user whose service profile is to be accessed. For example, the aggregate endpoint device may serve ten users with their respective UEs. Each of the ten users may then have a profile to be accessed. The P-CSCF may then add a P-served user header that identifies the specific user being served in the session request, prior to forwarding the session request to the S-CSCF. The session request that reaches the S-CSCF may then already have the P-served user header. Application servers that subsequently handle the session request may use the P-served user header to determine profile information, e.g., preferences, permissions, etc.

However, if the session request is directed towards a user endpoint device that utilizes the aggregate endpoint device (terminating session), Public User Identities (PUIDs) that identify a user (broadly a user or a user endpoint device currently associated with the user), may be used. The PUIDs may be managed via a SIP registrar (registry). It should be noted that PUID is also known as IP Multimedia Public user identity (IMPU) under the 3rd Generation Partnership Project (3GPP).

Table-1 provides an illustrative registrar that may be used for managing PUIDs. It should be noted that the SIP registrar (registry) is internal to the S-CSCF, in one embodiment. However, it should be noted that the present disclosure is not so limited. For example, in one alternate embodiment, the SIP registrar can be implemented as an external device to the S-CSCF. For example, PUID1 and PUID2 refer to two different users that access services via the same aggregate endpoint device. The SIP registrar may be used to manage the PUIDs.

TABLE 1

| PUID | P-CSCF | User Access |
|------|--------|-------------|
| PUID1 | P-CSCF B | AEP UA |
| PUID2 | P-CSCF A | AEP UA |

In one scenario, when the S-CSCF of the calling party routes the session request to the I-CSCF handling the destination, the I-CSCF interrogates the HSS to determine the S-CSCF serving the called party. The HSS then looks up all possible PUIDs that may be used to address a user. The HSS then returns a Serving-Call Session Control Function Fully Qualified Domain Name (S-CSCF FDQN) of the called party. The I-CSCF routes the incoming session request (e.g., SIP INVITE message) to the S-CSCF of the called party for completion. The S-CSCF for the called party then looks up all the possible PUIDs that may be used to address a user. Application servers, if needed, that handle the session request also repeat the lookup to determine the service to be provided. The processing performed by the HSS, S-CSCF and application servers may amount to processing of thousands of possible PUIDs in the request URI of messages. However, the customer is the same enterprise customer for each of the request URIs used to address the aggregate endpoint. Hence, the service provider processes the same service profile even if it retrieved for each request URI, one at a time.

In one embodiment, the current method provides a novel aggregate endpoint identifier. The aggregate endpoint identifier contains information that can be used to convey to routing devices that a request URI belongs to a specific aggregate endpoint. In one embodiment, it can also contain the designation of the routing device to which an Application Server will forward the SIP Message after it has received and processed the message. The aggregate endpoint identifier and a designation of the routing device (e.g., a S-CSCF, or an application server) that performs termination processing for the aggregate endpoint are stored in the HSS. They may be stored as a single SIP URI containing both the aggregate endpoint identifier and the designation of the routing device to which the I-CSCF is to route the message. The PUID(s) that belong to a specific aggregate endpoint are in the same user profile in the HSS. The HSS also maps to the aggregate endpoint's User Profile all possible PUIDs that belong to the aggregate endpoint. When an HSS receives a query from an I-CSCF, the HSS may then return the aggregate endpoint identifier along as part of the Location_Info_Answer (LIA). The LIA refers to information that provides a designation of the routing device to which the request is to be forwarded for termination processing. Thus, the HSS is conveying more information about the lookup, i.e., the designated routing device (e.g., a S-CSCF or an application server) and information that designates the specific aggregate endpoint as determined by the lookup of the PUID in the Request URI and other instructions for routing the request after the receiving routing device is ready to route the request to another routing device.

To further illustrate, instead of returning a LIA that may comprise "sip:scscf1.att.com", the HSS may return "sip:scscf1.att.com; aep-id=MDTWNJ10", where "MDTWNJ10" is an aggregate endpoint identifier that represents a designation of a specific aggregate endpoint. It should be noted that this example is only illustrative and should not be deemed as a limitation of the present method. This aggregate endpoint identifier is placed in the route header by the I-CSCF and is used to convey the specific, already determined, aggregate endpoint to the S-CSCF (or a specific application server), and, if necessary, other application servers. Therefore, the subsequent mapping of the request URI to the aggregate endpoint does not need to be performed by other network elements that are used to process the session request. If the I-CSCF is instructed to route to an Application Server rather than an S-CSCF, the HSS may return "sip:appServer1.att.com;aep-id=MDTWNJ10, S-CSCF=sip:scscf1.att.com."

In sum, the use of the aggregate endpoint identifier will allow the method to eliminate the need for the aggregate endpoint PUIDS (for each AEP there could be thousands of PUIDs) to have to be provisioned and stored in multiple network elements such as the application servers, the S-CSCF, etc. Instead, the use of the aggregate endpoint identifier allows the aggregate endpoint PUIDS to be stored in one network element, e.g., the HSS and then the aggregate endpoint information is used to indicate to the other network elements involved in a session establishment the identity of the aggregate endpoint. In one embodiment, the aggregate endpoint information will be additional information appended to the SIP URI in the LIA message.

In one embodiment, the current method provides processing a call to an aggregate endpoint using the PUID that represents the aggregate endpoint. The PUID that represents the aggregate endpoint is retrieved and added to a new route header. Subsequent S-CSCF and application servers are then able to process the session request using the PUID in the route header (the PUID of the aggregate endpoint), rather than processing based on the session request URI. The PUID that needs to be understood by downstream S-CSCFs and application servers is then the PUID of the aggregate endpoint. From the perspective of the downstream devices receiving a session request, the existence of the aggregate endpoint identifier in a route header indicates the PUID that represents the aggregate endpoint is to be used. For example, an application server may identify the services to be provided using the service profile associated with the PUID in the route header, which is the PUID of the aggregate endpoint. For example, an AS may add a P_Served_User header containing the PUID that was included in the SIP URI of the Route Header of the message it received, and send the message on, e.g., to the S-CSCF that was indicated in the same SIP URI.

In one embodiment, the above LIA comprises the Serving-Call Session Control Function Fully Qualified Domain Name (S-CSCF FDQN) of the called party. The I-CSCF may then forward the session request to the S-CSCF with the aggregate endpoint identifier included in the route header. The existence of the aggregate endpoint identifier (broadly a tag) in the route header indicates to the S-CSCF, the call is to be routed to a specific application server, e.g., a SIP application server, wherein the specific application server is tasked with providing a new route header that includes the PUID of the aggregate endpoint as discussed above. The S-CSCF may then receive the new route header (including the PUID of the aggregate endpoint) and proceed with termination processing using the PUID, rather than performing a lookup via the request URI. Subsequent application servers also identify the appropriate service profile based on the PUID of the aggregate endpoint without performing a lookup via the request URI.

Figure 2:
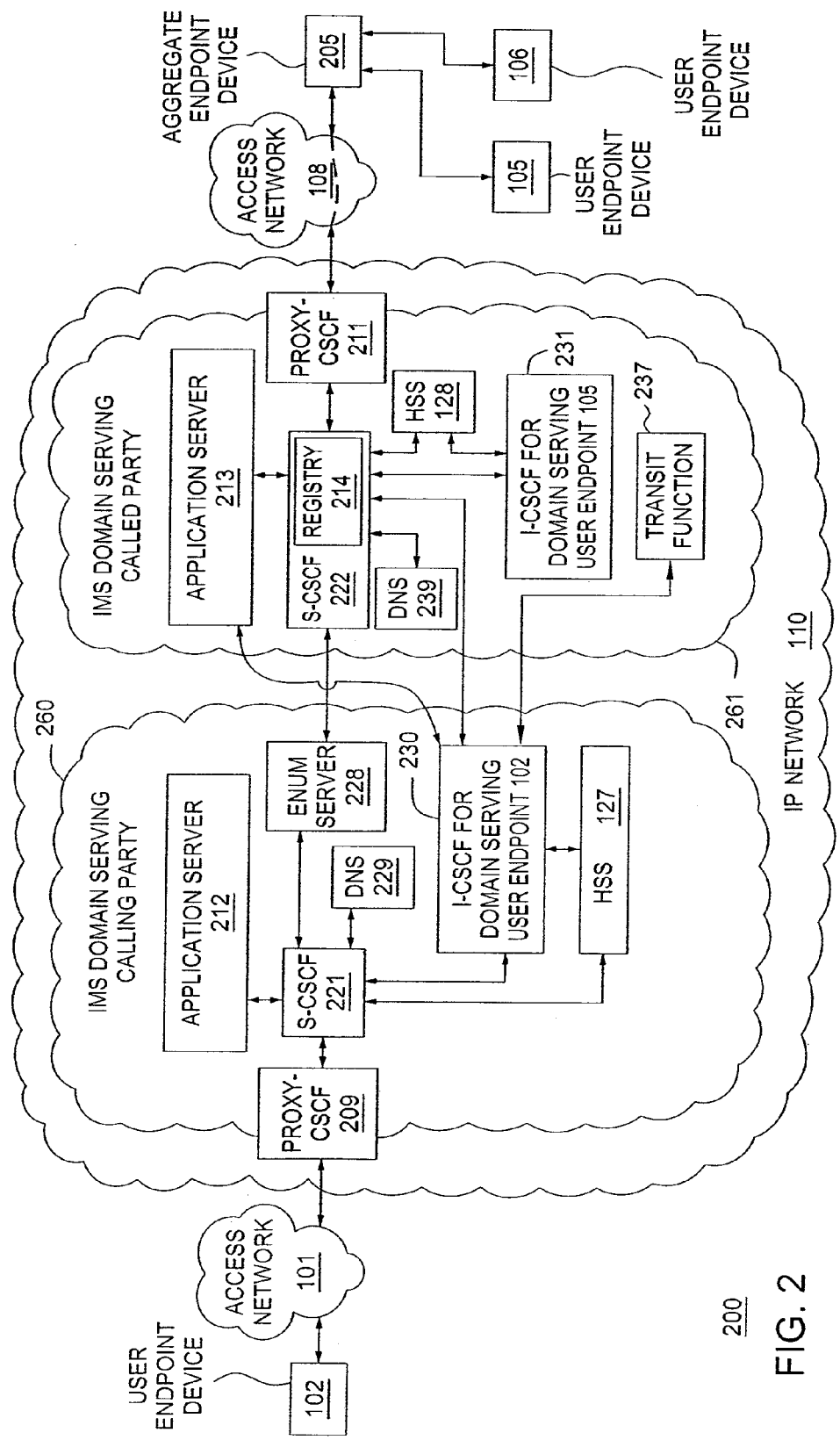
FIG. 2 illustrates an exemplary network in accordance with one embodiment of the current disclosure for processing a call to an aggregate endpoint device over a network.

FIG. 2 illustrates an exemplary network 200 in accordance with one embodiment of the current disclosure for processing a call to an aggregate endpoint device over a network. In one embodiment, the network 200 comprises User Endpoint (UE) device 102 communicating with an IMS network 110 via access network 101, and UE devices 105 and 106 communicating with the IMS network 110 via access network 108. The UE devices 105 and 106 reach the access network 108 via an aggregate endpoint device 205. The aggregate endpoint device 205 comprises a multi-user endpoint device that support a plurality of user endpoint devices.

For illustration, the IMS network 110 comprises domains 260 and 261. It should be noted that the IMS network 110 may comprise any number of domains. In one embodiment, the IMS domain 260 comprises a P-CSCF 209, a HSS 127, a S-CSCF 221, an I-CSCF 230 for domain 260, an ENUM server 228, a DNS 229, and an application server 212, interconnected for providing services to a plurality of customers. The IMS domain 261 comprises P-CSCF 211a, a HSS 128, P-CSCF 211b, a S-CSCF 222, a DNS 239, an application server 213 and an I-CSCF 231, interconnected for providing services to the plurality of customers. For example, the domain 260 and domain 261 may support various services (e.g., VoIP service, streaming video services, television services, cellular services, etc.). In another embodiment, Aggregate Endpoint 205 may also be connected to IMS Domain 261 through a second Access Network with different Proxy CSCFs.

It should be noted that the IMS domains 260 and 261 may employ similar network components and may have various other components that are not shown. The present disclosure includes only the components that are needed to describe the current method and apparatus with simplicity. In one example, the customer with UE 102 is served by the domain 260 and the customer with UE 105 is served by the domain 261. Specifically, P-CSCF 209, S-CSCF 221, DNS 229, and I-CSCF 230 are used for serving UE 102, and P-CSCF 211, S-CSCF 222, DNS 239, and I-CSCF 231 are used for serving UE 105. Terminating calls towards an aggregate endpoint device 205 are processed via an S-CSCF 222, wherein the S-CSCF 222 of the called party communicates with the aggregate endpoint device 205 via P-CSCF 211.

In one embodiment, the method first stores an aggregate endpoint identifier for the aggregate endpoint device 205 and a designation of S-CSCF 222 for termination processing for the aggregate endpoint 205 in the HSS 128. The HSS 128 places the PUIDs that belong to a specific aggregate endpoint in the same user profile. Specifically, since the user endpoint devices 105 and 106 are served by the aggregate endpoint 205, the PUIDs associated with the users of endpoint devices 105 and 106 are placed in the same user profile. The HSS 128 also maps to the aggregate endpoint device all possible request URIs that belong to the aggregate endpoint device. Specifically, the HSS 128 maps to the aggregate endpoint device 205 the request URIs of UEs 105 and 106. In one embodiment, when the HSS 128 receives a query from the I-CSCF 231, the HSS 128 returns the aggregate endpoint identifier for the aggregate endpoint device 205 along with a Location_Info_Answer (LIA).

In one embodiment, the method also provides and manages PUIDs (for aggregate endpoint devices and UEs) via the application server 213, e.g., a SIP application server. For example, the application server 213 may change a PUID in an existing route header to a PUID of an aggregate endpoint or may add a new route header with a PUID of an aggregate endpoint.

In one example, the aggregate endpoint device 205 receives an originating session request from UE 105. The aggregate endpoint device 205 then forwards the originating session across the P-CSCF 211 towards the S-CSCF 222, wherein the S-CSCF 222 comprises a registry 214 (SIP registrar) for processing the session request.

In another example, UE 102 initiates a session request towards UE 105 (e.g., sending a SIP INVITE message). The S-CSCF 221 receives the session request via P-CSCF 209. The S-CSCF 221 may then send a query for NAPTR resource records to the ENUM server 228. The ENUM server 228 may then return the NAPTR resource records if the E.164 number is registered. The S-CSCF 221 may then query the DNS 229 for the destination of the returned NAPTR records, e.g., the SIP URI of the called party.

Upon receiving a successful response to the query (queries) sent to the ENUM 228 and DNS 229, the S-CSCF 221 routes the call to the I-CSCF 231 via a border element (not shown). The I-CSCF 231 then receives and processes the session request. Specifically, the I-CSCF 231 receives the session request and interrogates the HSS 128 to determine where the session request is to be sent.

In one embodiment, the HSS 128 provides the I-CSCF 231 a route header that includes the aggregate endpoint identifier and the S-CSCF FDQN of the S-CSCF. The I-CSCF 231 receives the S-CSCF FDQN and the aggregate endpoint identifier from the HSS 128. The I-CSCF 231 then routes the session request that includes the aggregate endpoint identifier in the route header to the S-CSCF 222 (the S-CSCF of the called party), for completion in accordance with the received S-CSCF FDQN. The S-CSCF 222 then forwards the session request to the application server 213 to obtain the PUID of the aggregate endpoint. It should be noted that the session request already has a PUID (e.g., the dialed number of the called party, and the like). When a session request is received, the application server 213 interacts with S-CSCF 222 and supplies the appropriate PUID for processing the call. For example, the S-CSCF 222 may forward a session request to the application server 213. In turn, the application server 213 returns the session request to the terminating S-CSCF 222, wherein the returned session request comprises the PUID of an aggregate endpoint. For example, the application server 213 places the PUID of the aggregate endpoint device in the route header of the returned session request. For example, the application server 213 may insert the PUID of the aggregate endpoint in the P-Served-User Header of a SIP response.

The terminating S-CSCF 222 may then forward the session requests in accordance with the specific PUID received from the application server 213. In one example, the S-CSCF 222 can forward the session request towards one or more application servers (not shown), if necessary, that provide services using the PUID of the aggregate endpoint device 205. In one example, the S-CSCF 222 can forward the session request towards the aggregate endpoint device 205 via P-CSCF 211.

In one embodiment, the processing of calls described above can be implemented in a stateless routing device instead of the S-CSCF. For example, the method may be implemented in a Transit Function (TF) 237 that utilizes pre-provisioned decisions. For example, for originating sessions, the pre-provisioned decision can be implemented in P-CSCFs. For terminating sessions, the pre-provisioned decision can be implemented in an HSS or DNS server.

It should be noted that although the above disclosure illustrates that the session requests originated from another S-CSCF, the session requests may in fact originate from other sources. For example, if a device on a circuit switched network dialed an aggregate endpoint on the IMS, then the session request will come into the IMS through a circuit switched gateway. It would go from the circuit switched gateway to the I-CSCF. Other calls may come from a SIP interconnection with another network whether or not the other network had an S-CSCF. These session requests would also go to an I-CSCF.

Figure 5:
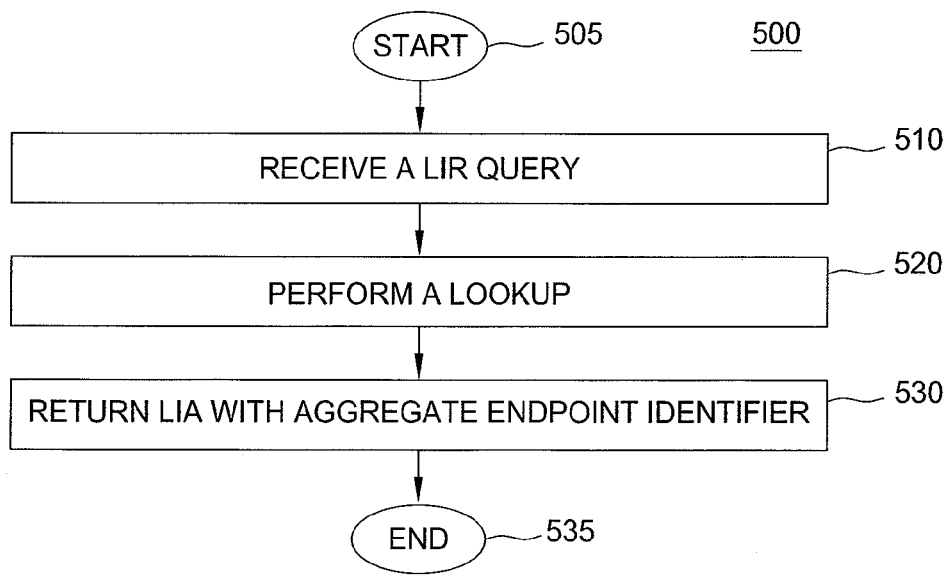
FIG. 5 illustrates a flowchart of a method for a HSS processing a query pertaining to a session request to an aggregate endpoint device over a network.

FIG. 5 illustrates a flowchart of a method 500 for a HSS processing a query pertaining to a session request to an aggregate endpoint device over a network. Method 500 starts in step 505 and proceeds to step 510.

In step 510, method 500 receives a Location-Info-Request (LIR) query, e.g., from an I-CSCF based on a Request URI. In other words, the HSS receives a LIR query from an I-CSCF for termination processing of the session request to an aggregate endpoint device.

In step 520, method 500 performs a lookup based on the request URI. In other words, the HSS will perform a lookup based on the Request URI to determine the routing device, e.g., a S-CSCF that the user is registered. Furthermore, in one embodiment if the user receives aggregate endpoint treatment (i.e., the user is served by an aggregate endpoint), the HSS will also determine an aggregate endpoint identifier associated with the aggregate endpoint. It should be noted that if the user does not receive aggregate endpoint treatment, then no aggregate endpoint identifier is identified and the HSS simply performs a normal lookup based on the request URI.

In step 530, in one embodiment, method 500 returns a location-info-answer together with the aggregate endpoint identifier, if the user receives aggregate endpoint treatment. Otherwise, method 500 returns only the location-info-answer, if the user does not receive aggregate endpoint treatment. Method 500 ends in step 535.

In one embodiment, the I-CSCF that initiated the query in FIG. 5 will insert the aggregate endpoint identifier into the route header and forward the session request to the identified S-CSCF for handling. The existence of the aggregate endpoint identifier in the route header used to address the S-CSCF from the I-CSCF would indicate to the S-CSCF that it should route the call to a specific application server as discussed further below in FIG. 3.

Figure 3:
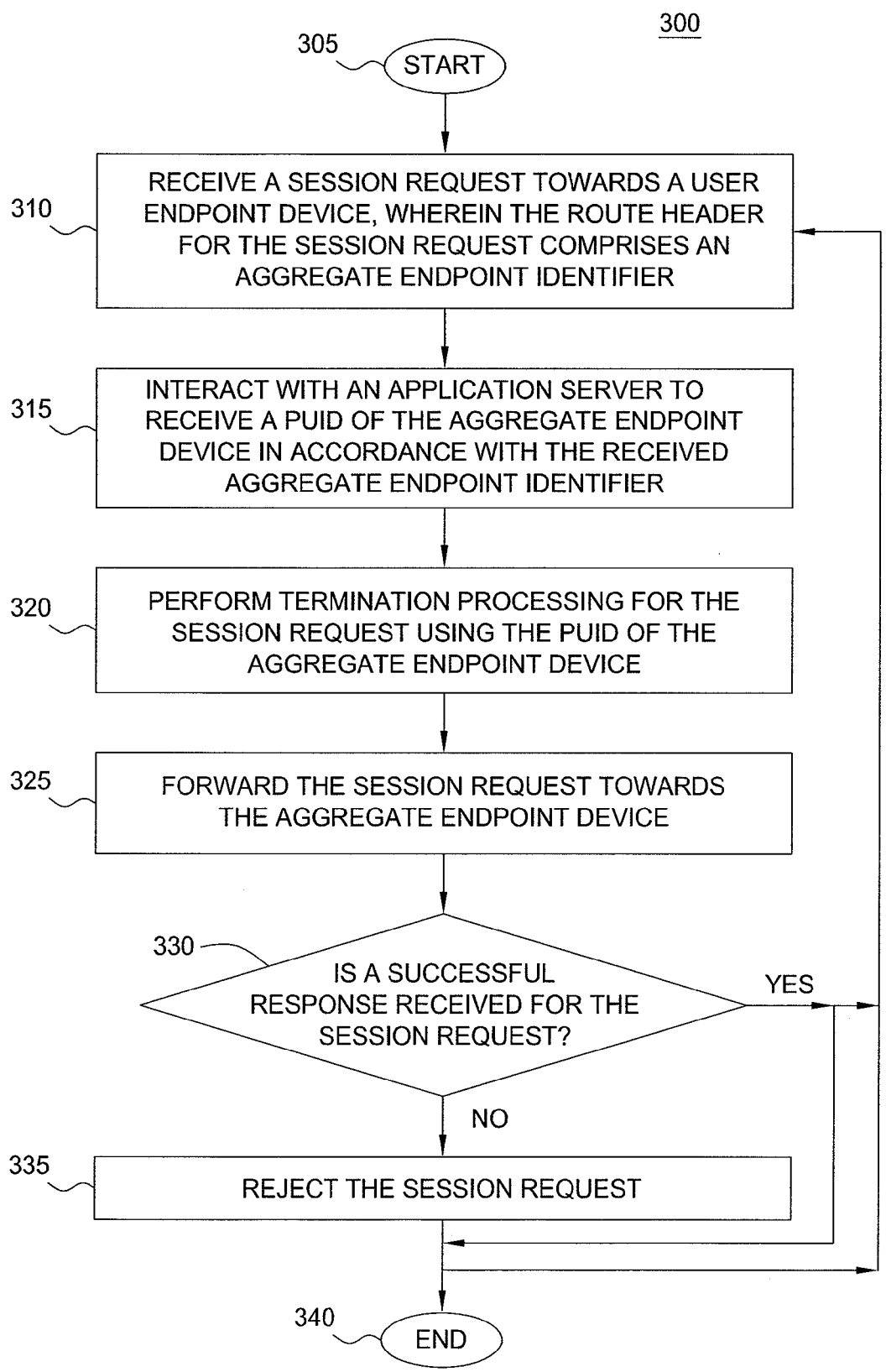
FIG. 3 illustrates a flowchart of a method for a Serving-Call Session Control Function (S-CSCF) processing a call to an aggregate endpoint device over a network.

FIG. 3 illustrates a flowchart of a method 300 for a Serving-Call Session Control Function (S-CSCF) processing a call to an aggregate endpoint device over a network. Method 300 starts in step 305 and proceeds to step 310.

In step 310, method 300 receives a session request towards a user endpoint device (more broadly towards a public user identity), wherein the route header for the session request comprises an aggregate endpoint identifier. For example, an S-CSCF may receive a SIP INVITE message from an I-CSCF for terminating at a user endpoint device of a subscriber of a VoIP service. In this example, the called party is the subscriber of the VoIP service and the called party accesses the network via an aggregate endpoint device. The route header for the SIP INVITE message then includes the aggregate endpoint identifier of the aggregate endpoint device serving the subscriber.

In step 315, method 300 interacts with an application server to receive a PUID of the aggregate endpoint device in accordance with the received aggregate endpoint identifier. For example, the existence of an aggregate endpoint identifier in the route header received from the I-CSCF indicates to the S-CSCF that the session request should be routed to a specific application server, e.g., a SIP application server. The specific application server may then identify the PUID of the aggregate endpoint device associated with the user endpoint device to which the session request is directed and add the PUID of the aggregate endpoint device to the route header of a returned session request.

In step 320, method 300 performs termination processing for the session request using the PUID of the aggregate endpoint device. For example, the S-CSCF may process the session request using the PUID of the aggregate endpoint device, instead of the request URI. In other words, the S-CSCF does not have to perform a lookup operation in accordance with the request URI.

In step 325, method 300 forwards the session request towards the aggregate endpoint device. For example, the S-CSCF forwards the session request towards the aggregate endpoint device via a P-CSCF for the specific PUID of the aggregate endpoint device.

In step 330, method 300 determines if a successful response is received for the session request. For example, the S-CSCF may determine if a SIP acknowledgement is received. If a successful response is received, the method proceeds to step 340 to end processing the current session request, or alternatively, to step 310 to continue receiving more requests. Otherwise, the method proceeds to step 335.

In step 335, method 300 rejects the session request. For example, the method provides a response to the session request with a rejection. The method then proceeds to step 340 to end processing the current session request, or alternatively, to step 310 to continue receiving more requests.

It should be noted that the above S-CSCF may query various application servers prior to forwarding the session request towards its destination. If other application servers are involved in providing service to the called party, the other application servers also provide services based on determining the appropriate service profile directly from the PUID of the aggregate endpoint. In other words, the application servers do not have to perform a lookup operation in accordance with the request URI. Thus, various application servers that are used in regular call handling procedures are omitted from the above description for clarity. Hence, the method of the current disclosure can be used to provide efficient call processing to aggregate endpoint devices in conjunction with any other services provided to the customer via other application servers, or like devices.

It should be noted that the various control functions, e.g., S-CSCF, P-CSCF, I-CSCF and the transit function are broadly described as functions. As such, these various control functions and the transit function can be deployed in any number of network elements, e.g., a routing device, a router, a switch, a border element, a gateway, an application server and the like.

It should be noted that although not specifically specified, one or more steps of methods 300 and 500 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
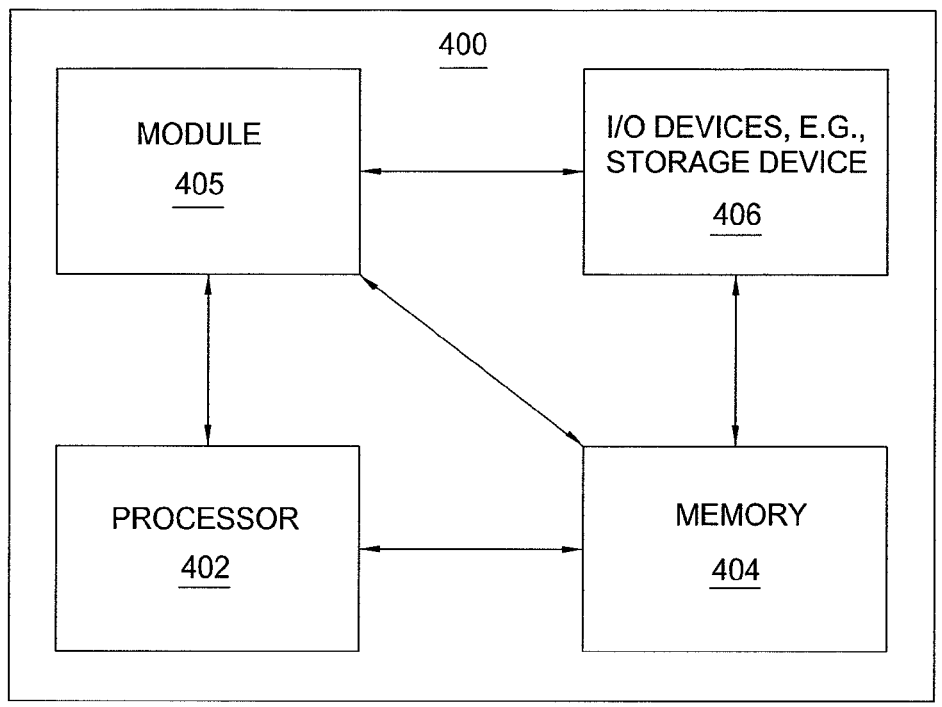
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for processing a call to an aggregate endpoint device over a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for processing a call to an aggregate endpoint device over a network can be loaded into memory 404 and executed by processor 402 to implement the functions as discussed above. As such, the present method 405 for processing a call to an aggregate endpoint device over a network (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a call to an aggregate endpoint device over a network, comprising:
    receiving, by a processor of a serving-call session control function, a session request wherein a route header for the session request comprises an aggregate endpoint identifier for use to obtain a public user identity of the aggregate endpoint device by the serving-call session control function;
    interacting, by the processor, with an application server to receive the public user identity of the aggregate endpoint device, for the session request, in accordance with the aggregate endpoint identifier, wherein the interacting comprises forwarding the session request to the application server and receiving a route header of a returned session request that comprises the public user identity of the aggregate endpoint device that was identified by the application server using the aggregate endpoint identifier;
    performing, by the processor, a termination processing for the session request using the public user identity of the aggregate endpoint device, wherein the aggregate endpoint device comprises a multi-user endpoint device that supports a plurality of user endpoint devices, wherein the termination processing is performed without performing a lookup in accordance with a request uniform resource identifier; and
    forwarding, by the processor, the session request towards the aggregate endpoint device.

2. The method of claim 1, wherein the public user identity of the aggregate endpoint device is received in a route header of a returned session request from the application server.

3. The method of claim 1, wherein a home subscriber server stores a designation of the serving-call session control function that is used to perform the termination processing for the aggregate endpoint device.

4. The method of claim 3, wherein the home subscriber server stores a public user identity that belongs to the aggregate endpoint device in a same user profile.

5. The method of claim 3, wherein the home subscriber server maps to the aggregate endpoint device all possible request uniform resource identifiers that belong to the aggregate endpoint device.

6. The method of claim 1, wherein the session request comprises an invite message to a called party from a calling party.

7. The method of claim 6, wherein the invite message is in accordance with a session initiation protocol.

8. The method of claim 1, wherein the termination processing comprises forwarding the session request to another application server for processing.

9. The method of claim 8, wherein the another application server processes the session request without performing a lookup in accordance with the request uniform resource identifier.

10. A non-transitory computer-readable storage medium storing a plurality of instructions which, when executed by a processor of a serving-call session control function, cause the processor to perform operations for processing a call to an aggregate endpoint device over a network, the operations comprising:
    receiving a session request by the serving-call session control function, wherein a route header for the session request comprises an aggregate endpoint identifier for use to obtain a public user identity of the aggregate endpoint device by the serving-call session control function;

interacting with an application server to receive the public user identity of the aggregate endpoint device, for the session request, in accordance with the aggregate endpoint identifier, wherein the interacting comprises forwarding the session request to the application server and receiving a route header of a returned session request that comprises the public user identity of the aggregate endpoint device that was identified by the application server using the aggregate endpoint identifier;

performing a termination processing for the session request using the public user identity of the aggregate endpoint device, wherein the aggregate endpoint device comprises a multi-user endpoint device that supports a plurality of user endpoint devices, wherein the termination processing is performed without performing a lookup in accordance with a request uniform resource identifier; and forwarding the session request towards the aggregate endpoint device.

11. The non-transitory computer-readable storage medium of claim 10, wherein the public user identity of the aggregate endpoint device is received in a route header of a returned session request from the application server.

12. The non-transitory computer-readable storage medium of claim 10, wherein a home subscriber server stores a designation of the serving-call session control function that is used to perform the termination processing for the aggregate endpoint device.

13. The non-transitory computer-readable storage medium of claim 12, wherein the home subscriber server stores a public user identity that belongs to the aggregate endpoint device in a same user profile.

14. The non-transitory computer-readable storage medium of claim 12, wherein the home subscriber server maps to the aggregate endpoint device all possible request uniform resource identifiers that belong to the aggregate endpoint device.

15. The non-transitory computer-readable storage medium of claim 10, wherein the session request comprises an invite message to a called party from a calling party.

16. The non-transitory computer-readable storage medium of claim 15, wherein the invite message is in accordance with a session initiation protocol.

17. The non-transitory computer-readable storage medium of claim 10, wherein the termination processing comprises forwarding the session request to another application server for processing.

18. The method of claim 1, wherein a home subscriber server stores the aggregate endpoint identifier.

* * * * *